US008243973B2

(12) United States Patent
Rickards et al.

(10) Patent No.: US 8,243,973 B2
(45) Date of Patent: Aug. 14, 2012

(54) COMMUNICATION EYEWEAR ASSEMBLY

(76) Inventors: Thomas M. Rickards, Miami Beach, FL (US); Thomas H. Perszyk, Mason, OH (US)

( * ) Notice: Subject to any disclaimer, the term of this patent is extended or adjusted under 35 U.S.C. 154(b) by 952 days.

(21) Appl. No.: 12/283,029

(22) Filed: Sep. 9, 2008

(65) Prior Publication Data
US 2010/0061579 A1 Mar. 11, 2010

(51) Int. Cl.
H04R 25/00 (2006.01)
(52) U.S. Cl. .......................................... 381/327; 381/322
(58) Field of Classification Search ................... 381/327, 381/376
See application file for complete search history.

(56) References Cited

U.S. PATENT DOCUMENTS

| | | | |
|---|---|---|---|
| 3,169,600 A | 2/1965 | Thomas | |
| 3,610,841 A | 10/1971 | Hutchings | |
| 3,787,643 A | 1/1974 | Nielsen | |
| 3,807,526 A | 4/1974 | Sygnator | |
| 3,825,700 A | 7/1974 | Jerry et al. | |
| 3,943,925 A | 3/1976 | Leight | |
| 3,946,168 A | 3/1976 | Preves | |
| 4,353,364 A | 10/1982 | Woods | |
| 4,683,587 A | 7/1987 | Silverman | |
| 4,819,270 A | 4/1989 | Lombardo | |
| 4,972,491 A | 11/1990 | Wilcox, Jr. | |
| 5,002,151 A | 3/1991 | Oliveira et al. | |
| 5,020,150 A | 5/1991 | Shannon | |
| 5,029,216 A | 7/1991 | Jhabvala et al. | |
| 5,265,165 A | 11/1993 | Rauch | |
| 5,298,692 A | 3/1994 | Ikeda et al. | |
| 5,335,285 A | 8/1994 | Gluz | |
| 5,367,345 A | 11/1994 | da Silva | |
| 5,396,563 A | 3/1995 | Yoshimi | |
| 5,475,449 A | 12/1995 | Pyle | |
| 5,541,677 A | 7/1996 | Huhtala | |
| 5,606,743 A | 2/1997 | Vogt et al. | |
| 5,703,670 A | 12/1997 | Callard | |
| 5,717,479 A | 2/1998 | Rickards | |
| 5,737,436 A | 4/1998 | Boyden | |
| 5,988,812 A | 11/1999 | Wingate | |
| 6,005,536 A | 12/1999 | Beadles et al. | |
| 6,010,216 A | 1/2000 | Jesick | |
| 6,012,812 A | 1/2000 | Rickards | |
| 6,085,428 A | 7/2000 | Casby et al. | |
| 6,091,832 A | 7/2000 | Shurman et al. | |
| 6,176,576 B1 | 1/2001 | Green et al. | |

(Continued)

FOREIGN PATENT DOCUMENTS
AU    3864597 A    3/1998
(Continued)

Primary Examiner — Davetta W Goins
Assistant Examiner — Amir Etesam
(74) Attorney, Agent, or Firm — Malloy & Malloy, P.L.

(57) ABSTRACT

A frame assembly worn to maintain at least one transparent eye panel in front of a wearer's eyes. A processor receives an incoming audio signal and wirelessly transmits it to an earpiece which audibly communicates the incoming signal to the wearer. An outbound microphone assembly picks up an outbound audio signal from the wearer and transmits it to the processor which transmits it to a remote recipient. An ambient microphone assembly picks up an ambient audio signal and transmits it to the processor. The processor is structured to enhance the incoming and/or the outbound audio signal based on the ambient audio signal. The processor transmits a voice component of the ambient audio signal to the earpiece. A camera assembly picks up an outbound visual signal and transmits it to the processor which further transmits it to a remote recipient. A display assembly displays an incoming visual signal.

32 Claims, 9 Drawing Sheets

U.S. PATENT DOCUMENTS

| | | |
|---|---|---|
| 6,233,345 B1 | 5/2001 | Urwyler |
| 6,629,076 B1 | 9/2003 | Haken |
| 6,729,726 B2 | 5/2004 | Miller et al. |
| 6,769,767 B2 | 8/2004 | Swab et al. |
| 6,850,166 B2 | 2/2005 | Deeds |
| 6,929,365 B2 | 8/2005 | Swab et al. |
| 6,950,531 B2 | 9/2005 | Rickards |
| 6,966,647 B2 | 11/2005 | Jannard et al. |
| 7,004,582 B2 | 2/2006 | Jannard et al. |
| 7,013,009 B2 | 3/2006 | Warren |
| 7,079,876 B2 | 7/2006 | Levy |
| 7,131,058 B1 | 10/2006 | Lapstun et al. |
| 7,133,532 B2 | 11/2006 | Rickards |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,231,038 B2 | 6/2007 | Warren |
| 7,328,048 B2 | 2/2008 | Levy |
| 7,430,300 B2 * | 9/2008 | Vosburgh et al. ............ 381/376 |
| 7,512,414 B2 * | 3/2009 | Jannard et al. ............ 455/556.1 |
| 7,869,768 B1 * | 1/2011 | Vishlitzky ................ 455/67.13 |
| 2005/0096096 A1 * | 5/2005 | Birli et al. ................ 455/569.1 |
| 2006/0052146 A1 * | 3/2006 | Ou ............................ 455/575.2 |
| 2007/0116318 A1 | 5/2007 | Rickards |
| 2009/0034775 A1 * | 2/2009 | Burton ........................ 381/380 |

FOREIGN PATENT DOCUMENTS

| | | |
|---|---|---|
| AU | 759466 | 6/1999 |
| CA | 2215734 | 5/1998 |
| CN | 2108942 U | 7/1992 |
| CN | 98814067.5 | 7/2004 |
| IT | UD96A000156 | 2/1998 |
| WO | WO 94/14152 | 6/1994 |
| WO | WO 99/27413 | 6/1999 |

* cited by examiner

COMMUNICATION EYEWEAR ASSEMBLY

BACKGROUND OF THE INVENTION

1. Field of the Invention

The present invention is directed to a communication eyewear assembly that is structured be worn on a person's head so as to protect the person's eyes and also to permit hands-free wireless multimedia communication. The communication eyewear assembly is additionally structured to facilitate such communication in a noisy environment. In particular, the assembly is structured to enhance incoming and/or outgoing audio signals to overcome the inherent difficulties presented by ambient noise. Moreover, the assembly is structured to permit the wearer to hear others speaking directly to the wearer without having to first remove or otherwise manually adjust the fit of the assembly.

2. Description of the Related Art

The use of eyewear, particularly protective eyewear, such as sunglasses or safety glasses, has achieved near universal adoption by modern society. So too has the use of various types of communication devices, such as radios, telephones, personal digital assistants, portable music players, etc. More recently, attempts have been made to combine certain features of each of these types of equipment to address the needs of persons who require both eye protection and audiovisual communicability, such as people working in industrial, mining, construction, or military settings. However, despite some progress in the art, current technologies have failed to address many significant challenges.

One problem with current devices is that the speakers or earphones, etc., are physically connected to the rest of the device. In some cases, this can be extremely inconvenient in terms of comfort, as it can be difficult or even impossible to adjust or position the eye protection components independently from the speakers or earphones. In other cases, the listening mechanisms are connected to the rest of the device by sound transmitting cords. Although such cords may permit some independent adjustment, they are also prone to getting snagged or tangled, and are thus susceptible to damage.

Moreover, although it would appear preferable in some cases to provide a communication eyewear assembly that comprises wireless earphones, this has not been a practical option. For example, existing pairs of wireless earphones are physically connected to one another, which inhibits independent adjustment of the earphones and creates similar comfort and clutter issues to those described above. Further still, existing wireless earphones, such as those commonly used in conjunction with cellular telephones, are structured to directly receive and transmit voice communication signals, requiring the use of high power transceivers and other bulky components. Thus, for a variety of reasons, such technology is not adaptable for use with communication eyewear. It would therefore be advantageous to provide a communication eyewear assembly that comprises wireless earphones which do not require high power transceivers or other bulky components, and which are not tethered to each other.

Another problem with current devices is that they lack adequate measures for dealing with the effects of operating in noisy environments in that the background noise of such environments inhibits effective communication. For instance, when an incoming voice signal or music signal is communicated to a wearer of communications equipment in a noisy environment, the ambient noise can drown out or interfere with the sounds produced by the headphones, earphones, etc. It would therefore be advantageous to provide for a communication eyewear assembly that is structured to overcome the inherent difficulties presented by ambient noise.

Similarly, when a wearer of communications equipment speaks into a microphone, the proximity of the wearer's mouth is the principal factor in determining the quality of the voice signal being communicated. However, there can be significant amounts of background noise picked up in loud environment, to the point where the wearer's voice is unintelligible over the background noise, no matter how close the person's mouth is to the microphone. As such, it would also be beneficial to provide for a communication eyewear assembly that is structured to overcome such difficulties presented by ambient noise.

Yet another problem arises when another person in proximity to the wearer speaks directly to the user in a loud environment without the aid of another communication device. In such instances, the wearer must remove at least their headphones, earphones, ear plugs, etc., in order to hear the other person speak. In some cases, the wearer must also remove their eye protection, especially in cases where the earphones, etc. are attached in some manner to the eye protection. This is not only inconvenient, but it can also be potentially dangerous in that the wearer's ears and/or eyes will be exposed to the ambient, perhaps hazardous, environment. It would therefore be advantageous to provide a communication eyewear assembly that is structured primarily to be worn on a person's head and that, in addition to permitting hands-free wireless multimedia communication, permits the wearer to hear others speaking directly to the wearer without having to first remove or otherwise manually adjust the fit of the assembly.

SUMMARY OF THE INVENTION

The present invention is directed towards a communication eyewear assembly which is structured to be worn on a person's head so as to protect the person's eyes and also to permit hands-free multimedia wireless communication. The communication eyewear assembly is additionally structured to facilitate such communication in a noisy environment. In particular, the assembly is structured to enhance incoming and/or outgoing audio signals to overcome the inherent difficulties presented by the ambient noise of such environments. Moreover, the assembly is structured to permit the wearer to hear others speaking directly to the wearer without having to first remove or otherwise manually adjust the fit of the assembly.

In at least one embodiment, the communication eyewear assembly comprises a frame assembly which is structured to be worn on a person's head. Accordingly, the frame assembly is structured to be supportably disposed on the wearer so as to maintain at least one substantially transparent eye panel in a generally shielding position in front of the wearer's eyes. In one such embodiment, the frame assembly comprises a front frame member and two eye panels coupled thereto. In a further embodiment, the frame assembly additionally comprises a pair of legs structured to effectively retain and position the front frame member in front of the wearer's eyes.

For applications where it is desirable to reduce the brightness of light perceived by the wearer's eyes, the eye panels can be tinted. For applications where it is desirable to reduce the amount of harmful wavelengths of light reaching the wearer's eyes, the eye panels can include ultraviolet protection such as UV coatings. The eye panels can also be polarized for protective purposes and/or for viewing enhancement purposes. The eye panels can also comprise prescription lenses. In at least one embodiment, the eye panels can also comprise a shatterproof material of construction for additional protection in the event of significant impact to the eye panels by a foreign object.

The communication eyewear assembly further comprises a processor which is coupled to the frame assembly. The processor is structured and disposed to receive an incoming audio signal, typically from a remote location. In one embodiment, the incoming audio signal comprises real-time voice data, such as from another person with whom the wearer is communicating. In another embodiment, the incoming audio signal comprises music data, such as from a remotely stored and transmitted music file. The processor is further structured and disposed to transmit an outbound audio signal to another entity, such as real-time voice data from the wearer to another person with whom the wearer is communicating.

The communication eyewear assembly also comprises a power supply structured and disposed to provide power to the processor. The power supply can also be structured to supply power to other components of the assembly. The power supply can also be rechargeable. For example, in one embodiment, the power supply comprises a rechargeable battery pack that can be charged by an external power source that has been removably coupled to the assembly.

The communication eyewear assembly additionally comprises at least one earpiece structured to be disposed in wireless communication with the processor and further structured to be disposed at one of the wearer's ears. As such, the processor retransmits the received incoming audio signal to at least one earpiece, which in turn communicates the incoming audio signal to the wearer via a speaker assembly. In a further embodiment, the communication eyewear assembly comprises two earpieces, each of which is structured to be disposed at a different one of the wearer's ears. In a still further embodiment, the earpieces are additionally structured to substantially muffle ambient noise, further facilitating communication.

In yet another embodiment, the earpieces are structured to be removably secured to the frame assembly for storage. In one embodiment, each earpiece comprises a clip structured to removably secure the earpiece to the frame assembly when the earpiece is not in use. The earpiece and the frame assembly can also be cooperatively structured to charge a rechargeable earpiece power supply when the earpiece is disposed in a stored orientation.

In at least one embodiment, the communication eyewear assembly is further structured to enhance the incoming audio signal based on an ambient audio signal. By way of example, the ambient audio signal will typically comprise the background sounds generated by the surrounding environment. As such, an ambient microphone assembly is disposed and structured to pick up an ambient audio signal and transmit the ambient audio signal to the processor. In one embodiment, the ambient microphone assembly is coupled to the earpiece. In another embodiment, the ambient microphone assembly is coupled to the frame assembly. Accordingly, the processor is further structured to enhance the incoming audio signal based on the ambient audio signal. For example, in one embodiment, the processor is structured to adjust a volume level of the incoming audio signal relative to a volume level of the ambient audio signal.

The communication eyewear assembly further comprises an outbound microphone assembly disposed and structured to pick up an outbound audio signal from the wearer and transmit the outbound audio signal to the processor. The processor is structured transmit to another entity the outbound audio signal received from the outbound microphone assembly. The processor is also structured to enhance the outbound audio signal based on the ambient audio signal. In at least one embodiment, the processor is structured to strengthen the outbound audio signal relative to the ambient audio signal. More specifically, the processor is structured to reduce an ambient noise component of the outbound audio signal and strengthen the voice component of the outbound audio signal based on the characteristics of the ambient audio signal.

The processor is further structured to identify a voice component of the ambient audio signal which has been picked up by the ambient microphone assembly and sent to the processor. This can occur, for example, when another person speaks directly to the wearer without using another communication device. As such, the processor is further structured to transmit the identified voice component of the ambient signal to at least one earpiece. Accordingly, the wearer can listen to the other person's direct verbal communication without having to first remove or otherwise manually adjust the fit of the communication eyewear assembly. In a further embodiment, such as in a high noise environment wherein the other person directs their speech toward a specific one of the wearer's earpieces, the processor is further structured to transmit the identified voice component to the corresponding earpiece.

The communication eyewear assembly additionally comprises a camera assembly disposed and structured to pick up an outbound visual signal, which may comprise image data and/or video data. Because the assembly is worn on a wearer's head, the outbound visual signal will typically reflect the view as seen from the wearer's perspective, although other views may also be captured including, but not limited to, views directed behind the wearer. As with the other aforementioned multimedia components, the camera assembly is further structured to transmit the outbound visual signal to the processor. Accordingly, the processor is structured to transmit to another entity the outbound visual signal received from the camera assembly.

The processor is also structured to receive an incoming visual signal from a remote location. For instance, the incoming visual signal may comprise image data and/or video data, such as pictures or movies from a remotely stored and transmitted data file. As such, the communication eyewear assembly further comprises a display assembly disposed and structured to display the incoming visual signal received by the processor. More specifically, the display assembly includes at least one display unit disposed and structured to display the incoming visual signal to the wearer.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown throughout the accompanying figures, the present invention is directed towards a communication eyewear assembly generally indicated as 10.

The communication eyewear assembly 10 is structured to be worn on a person's head so as to protect the person's eyes and also to permit hands-free wireless multimedia communication. The communication eyewear assembly 10 is additionally structured to facilitate such communication in a noisy environment, such as that of a loud, industrial environment, or that found in a variety of other situations, such as, but not limited to, military operations, fire and rescue operations, public safety operations, sports activities, etc. In particular, the assembly 10 is structured to enhance incoming and/or outgoing audio signals to overcome the inherent difficulties presented by the ambient noise of such environments. Moreover, the assembly 10 is structured to permit the wearer to hear others speaking directly to the wearer without having to first remove or otherwise manually adjust the fit of the assembly.

Figure 1:
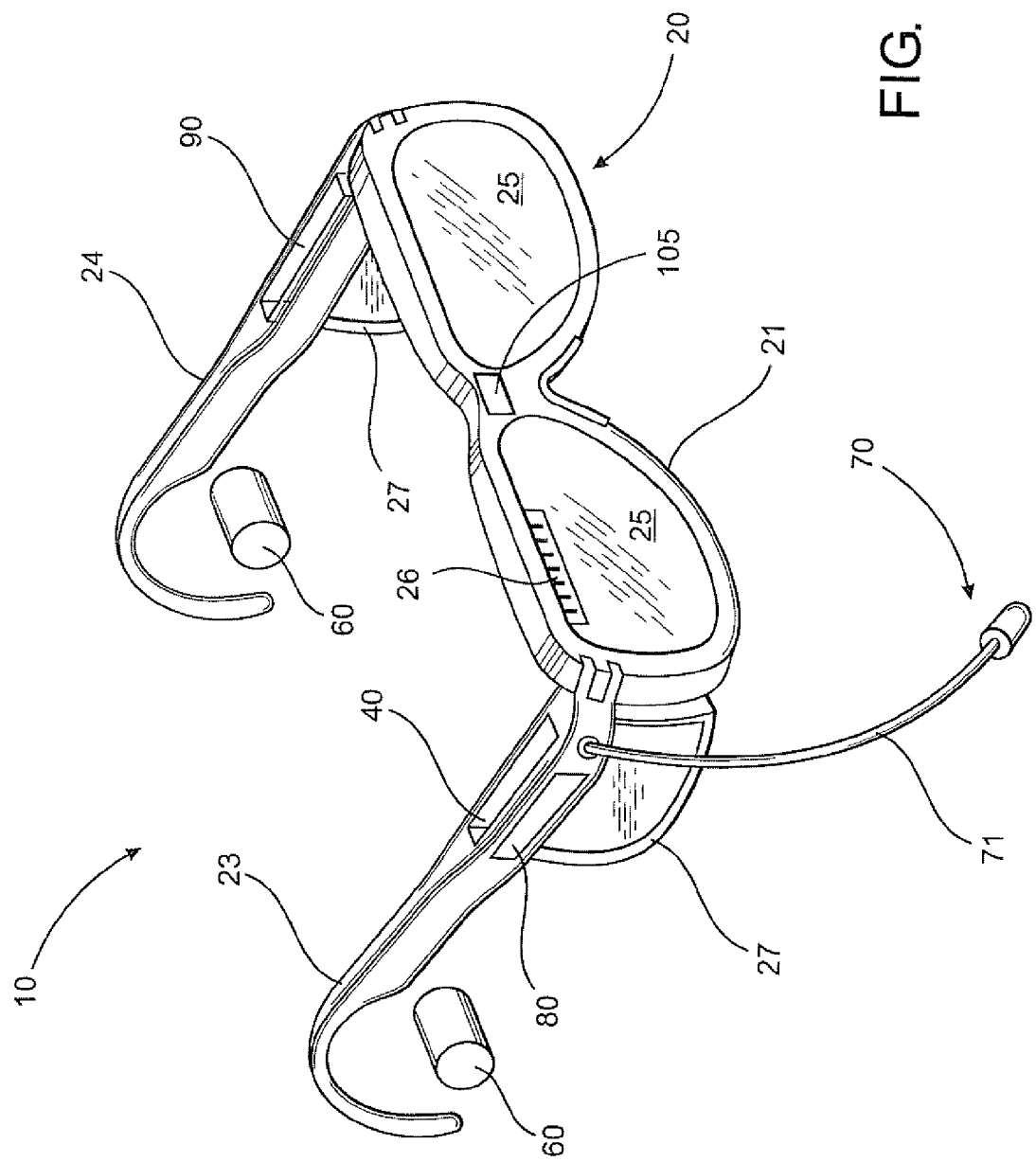
FIG. 1 is a perspective view of one embodiment of a communication eyewear assembly in accordance with the present invention.

As seen in FIG. 1, the communication eyewear assembly 10 comprises a frame assembly 20 which is structured to be worn on a person's head. Accordingly, the frame assembly 20 is structured to be supportably disposed on the wearer so as to maintain at least one substantially transparent eye panel 25 in a generally shielding position in front of the wearer's eyes.

In the embodiment of FIG. 1, the frame assembly 20 comprises a front frame member 21 and two eye panels 25 coupled thereto. In this embodiment, each eye panel 25 is structured to substantially shield the front of a different corresponding eye of the wearer while also permitting clear vision therethrough.

For applications where it is desirable to reduce the brightness of light perceived by the wearer's eyes, the eye panels 25 can be tinted. For applications where it is desirable to reduce the amount of harmful wavelengths of light reaching the wearer's eyes, the eye panels 25 can include ultraviolet protection such as UV coatings. The eye panels 25 can also be polarized for protective purposes and/or for viewing enhancement purposes. The eye panels 25 can also comprise prescription lenses. In at least one embodiment, the eye panels 25 can also comprise a shatterproof material of construction for additional protection in the event of significant impact to the eye panels 25 by a foreign object.

The frame assembly 20 further comprises at least one leg 23, 24 structured to effectively retain and position the front frame member 21 in front of the wearer's eyes during activity of the wearer. In the embodiment of FIG. 1, the frame assembly 20 comprises a first leg 23 and a second leg 24, each leg 23, 24 structured to extend from opposite sides of the front frame member 21 towards a rear thereof. The legs 23, 24 are disposed in a generally perpendicular relation to the front frame member 21 so as to extend over and grip the wearer's ears when the front frame member 21 is operatively disposed in front of the wearer's eyes.

In at least one embodiment, the frame assembly 20 further comprises pair of side eye panels 27. Each side eye panel 27 is disposed and structured to substantially shield a different eye of the wearer. Moreover, the side eye panels 27 can be further structured to permit clear peripheral vision therethrough. As shown in FIG. 1, in at least one embodiment, the side eye panels 27 are each coupled to a different leg 23, 24. As with the eye panels 25, the side eye panels 27 can be tinted, UV coated, and/or polarized. The side eye panels 27 can also comprise a shatterproof material of construction.

Turning now to the communication aspects of the present invention, the communication eyewear assembly 10 provides for wireless communication between a wearer and other entities, such as, but not limited to, other wearers, control stations, broadcast stations, etc. By way of example, the wireless communication could involve a wearer located on a factory floor communicating with a manager located in a control station. As another example, the wireless communication could involve the wearer listening to music being broadcast from a broadcast station. Of course, these examples are meant for illustrative purposes only, as the present invention can apply to a variety of other applications and circumstances.

Accordingly, the communication eyewear assembly 10 comprises a processor 40 which is coupled to the frame assembly 20. The processor 40 is structured and disposed to receive an incoming audio signal, typically from a remote location. For example, in one embodiment, the incoming audio signal comprises real-time voice data, such as from another person with whom the wearer is communicating. In another embodiment, the incoming audio signal comprises music data, such as from a remotely stored and transmitted music file. The processor 40 is further structured and disposed to transmit an outbound audio signal to another entity, such as real-time voice data from the wearer to another person with whom the wearer is communicating. Further details of the multimedia communication capabilities of the processor 40, including the incoming and outbound visual signals, are discussed in more detail below.

In at least one embodiment, the processor 40 is structured and disposed to fit inside of the frame assembly 20. For example, in the embodiment of FIG. 1, the processor 40 is disposed inside of the first leg 23. It should be noted, however, that it is within the scope and intent of the present invention that the processor 40 can be structured and disposed to fit inside of other portions of the frame assembly 20, including, but not limited to, the second leg 24, the front frame member 21, etc.

The communication eyewear assembly 10 further comprises a power supply 90 structured and disposed to provide power to the processor 40. The power supply 90 can also be structured to supply power to other components of the assembly 10. In at least one embodiment, the power supply 90 is structured and disposed to fit inside of the frame assembly 20. For example, in the embodiment of FIG. 1, the power supply 90 is disposable inside of the second leg 24. It should be noted, however, that it is within the scope and intent of the present invention that the power supply 90 can be structured and disposed to fit inside of other portions of the frame assembly 20, including, but not limited to, the first leg 23, the front frame member 21, etc. The power supply 90 can also be rechargeable. For example, in one embodiment, the power supply 90 comprises a rechargeable battery pack that can be charged by an external power source that has been removably coupled to the assembly 10.

The communication eyewear assembly 10 further comprises at least one earpiece 60 structured to be disposed in wireless communication with the processor 40 and further structured to be disposed at one of the wearer's ears. As such, the processor 40 retransmits the received incoming audio signal to at least one earpiece 60, which in turn communicates the incoming audio signal to the wearer. With specific reference to the embodiment of FIG. 1, the communication eyewear assembly 10 comprises two earpieces 60, each of which are structured to be disposed at a different one of the wearer's ears. Moreover, in the embodiment of FIG. 1, the earpieces 60 are further structured to be at least partially inserted into the wearer's ears when disposed in their respective operative orientations.

Figure 2:
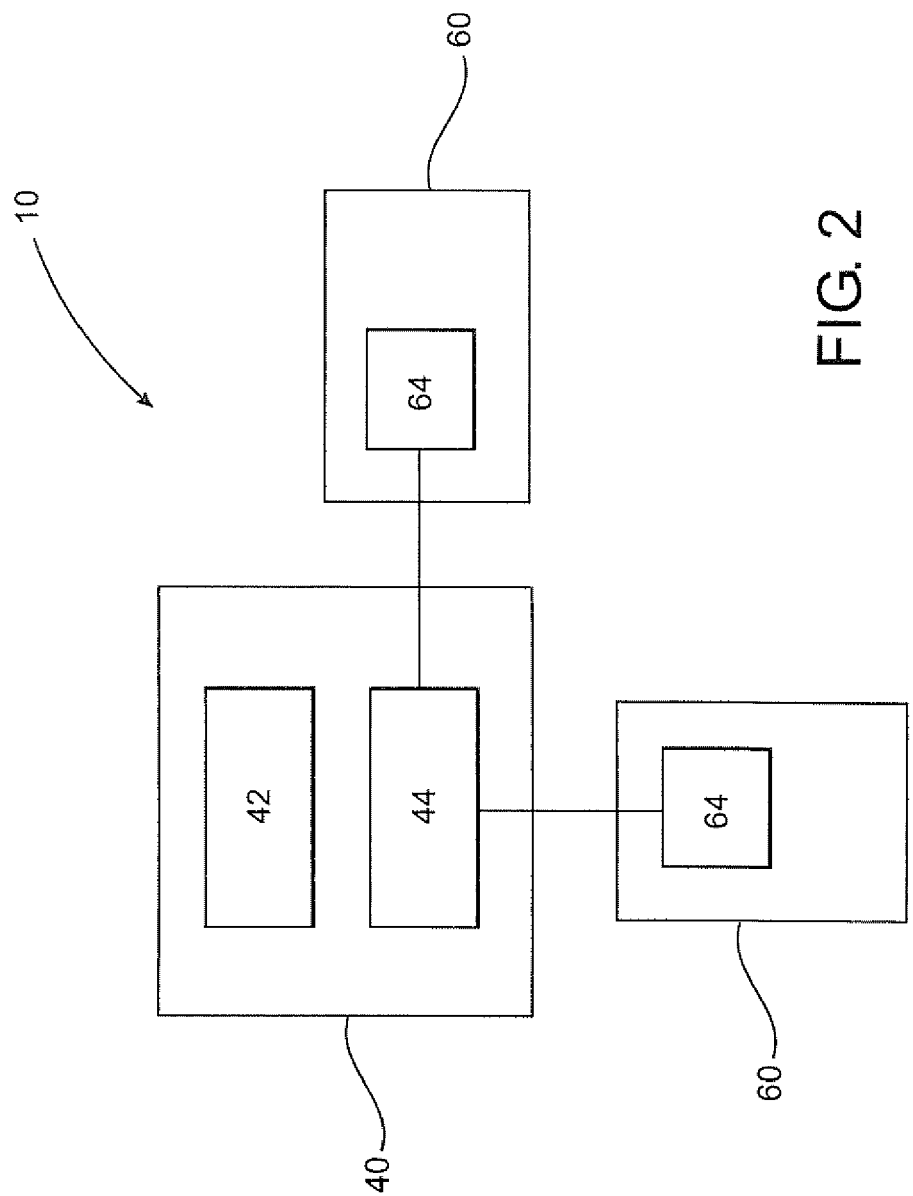
FIG. 2 is a schematic illustration of one embodiment of a transceiver configuration in accordance with the present invention.

With regard to inter-component connectivity as well as remote connectivity, the processor 40 comprises at least one transceiver structured to facilitate wireless communication. For example, with reference to the embodiment of FIG. 2, the processor 40 comprises a first transceiver 42 and a second transceiver 44. The first transceiver 42 is structured to receive an incoming audio and/or visual signal from a remote source, and is also structured to transmit an outbound audio and/or visual signal to a remote destination. In at least one embodiment, the first transceiver utilizes radio frequency communication. It is, however, within the scope and intent of the present invention that other suitable wireless technologies may also be utilized. The outbound audio signal will ordinarily correspond to the wearer's voice which has been picked up by an outbound microphone assembly 70, such as the one shown in FIG. 1 and described in greater detail below. Similarly, the outbound visual signal will ordinarily correspond to an image captured by a camera assembly 103, also described in greater detail below.

The second transceiver 44 is structured to wirelessly communicate with the earpieces 60. In one embodiment, the second transceiver utilizes radio frequency communication technology. In another embodiment, the second transceiver utilizes magnetic induction communication technology. It is, however, within the scope and intent of the present invention that other suitable wireless technologies may also be utilized. In an alternative embodiment, the processor 40 comprises a single transceiver structured to communicate with remote entities as well as with the earpieces 60.

In addition, each earpiece 60 comprises an earpiece transceiver 64 structured to facilitate communication with the processor 40. For example, in the embodiment of FIG. 2, the earpiece transceivers 64 are each disposed in wireless communication with the second transceiver 44. In such an embodiment, the specific communication technology of the earpiece transceivers 64 matches that of the second transceiver 44, such as, but not limited to, radio frequency technology, magnetic induction technology, etc. In a further embodiment, each earpiece transceiver 64 is uniquely identifiable by the processor 40. For example, in one such embodiment, each earpiece transceiver 64 comprises a unique signature, such as a radio or magnetic identification, which is recognizable by the processor 40. Accordingly, the processor 40 can transmit different content to each earpiece transceiver 64. For instance, in one embodiment, the processor 40 can transmit a first stereo music channel component of the incoming audio signal to one identified earpiece transceiver 64, and transmit a second stereo music channel component of the incoming audio signal to the other identified earpiece transceiver 64.

With reference now to FIGS. 3-6, in at least one embodiment, the communication eyewear assembly 10 is further structured to enhance the incoming audio signal based on an ambient audio signal. By way of example, the ambient audio signal will typically comprise the background sounds generated by the surrounding environment. As such, an ambient microphone assembly 75 is disposed and structured to pick up an ambient audio signal and transmit the ambient audio signal to the processor 40. In at least one embodiment, the ambient microphone assembly 75 is coupled to the earpiece 60. For example, in the embodiment of FIG. 4, the ambient microphone assembly 75 comprises an earpiece microphone assembly 66 disposed and structured to pick up an ambient audio signal and transmit the ambient audio signal to the processor 40. As another example, the ambient microphone assembly 75 can comprise one or more frame microphone assemblies 76, such as those described in more detail in FIG. 5, below.

Accordingly, the processor 40 is further structured to enhance the incoming audio signal based on the ambient audio signal, and to transmit the enhanced incoming audio signal to the earpiece 60. For example, in the embodiment of FIG. 3, the processor 40 includes a volume adjustment circuit 45 structured to adjust a volume level of the incoming audio signal relative to a volume level of the ambient audio signal. In a further embodiment including two earpieces 60, each disposed at a different one of the wearer's ears, the processor 40 is further structured to independently adjust the volume level of the incoming audio signal transmitted to each earpiece relative to the volume level of the ambient audio signal picked up from each respective side of the wearer.

Figure 4:
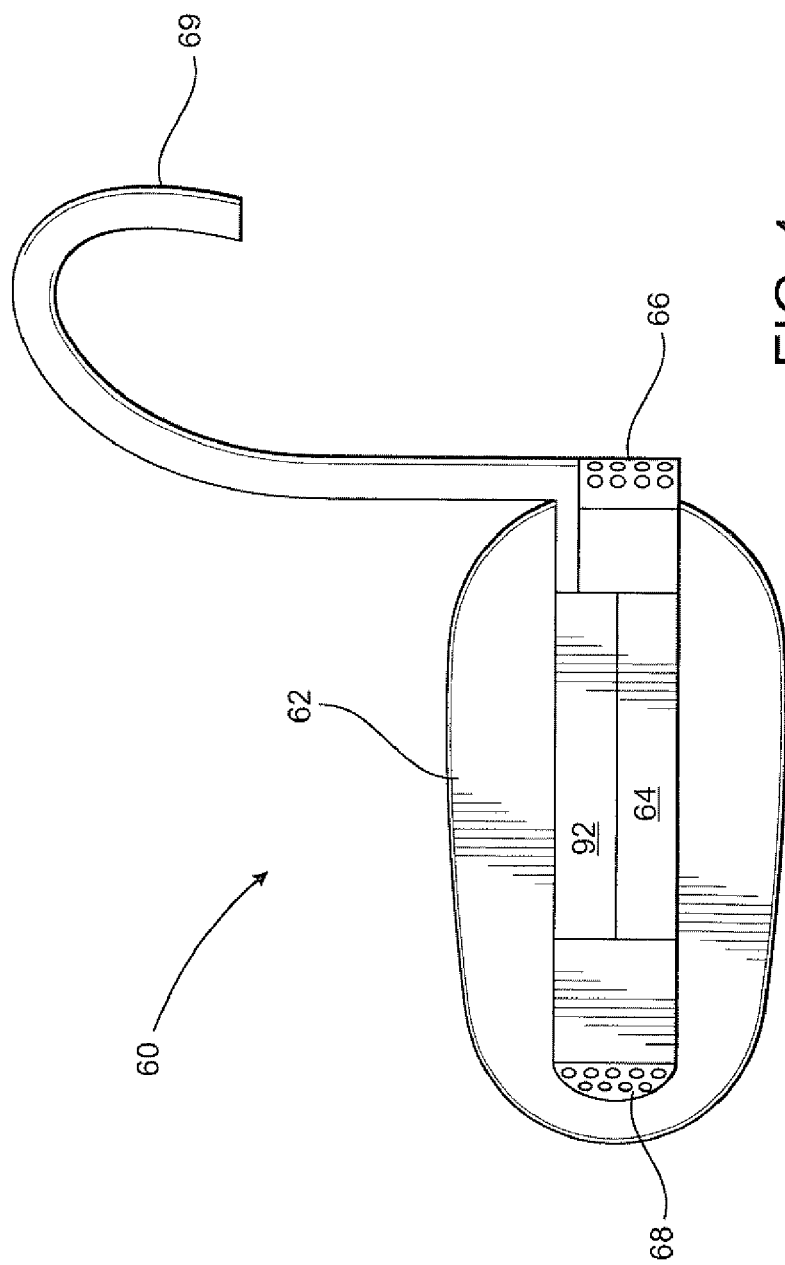
FIG. 4 is a cross section view of one embodiment of an earpiece in accordance with the present invention.

Turning in more detail to the embodiment of FIG. 4, the earpiece 60 further comprises a speaker assembly 68 structured and disposed to audibly communicate the enhanced incoming audio signal to the wearer. In this embodiment, the speaker assembly 68 is structured to be at least partially inserted into the ear of the wearer when disposed in an operative orientation.

The earpiece 60 is additionally structured to substantially muffle ambient noise, further facilitating communication. As shown in the embodiment of FIG. 4, at least a portion of the earpiece 60 is structured to be inserted into the wearer's ear so as to substantially muffle the ambient noise. More specifically, the earpiece 60 of FIG. 4 additionally comprises a disposable insert 62 structured to substantially muffle the ambient noise. The disposable insert 62 can be formed, for instance, from a sound-deadening, compressible material, such as high density foam, although a variety of other suitable materials may also be utilized. For at least sanitary purposes, the disposable insert 62 can be discarded and replaced after use.

Also depicted in FIG. 4 is the earpiece transceiver 64, which is communicatively coupled to both the speaker assembly 68 and the earpiece microphone assembly 66. The earpiece transceiver 64 is structured to facilitate communication between the respective earpiece components 66, 68 and the processor 40.

The earpiece 60 further comprises an earpiece power supply 92 structured and disposed to provide power to the speaker assembly 68 and the earpiece microphone assembly 66, as well as to the earpiece transceiver 64. In at least one embodiment, the earpiece power supply 92 can be rechargeable.

Referring again to FIG. 1, the communication eyewear assembly 10 further comprises an outbound microphone assembly 70 disposed and structured to pick up an outbound audio signal from the wearer and transmit the outbound audio signal to the processor 40. For instance, in the embodiment of FIG. 1, the outbound microphone assembly 70 comprises an adjustable elongate segment 71 which extends from the first leg 23 of the frame assembly 20. The adjustable elongate segment 71 is structured to permit adjustment of the microphone assembly 70 in front of the wearer's mouth to better pick up the outbound audio signal, which, in at least one embodiment, comprises real-time voice data of the wearer's spoken voice. In this embodiment, the outbound microphone assembly 70 is in disposed in wired communication with the processor 40. However, in another embodiment, the outbound microphone assembly 70 can be disposed in wireless communication with the processor 40, such as with the second transceiver 44.

Figure 3:
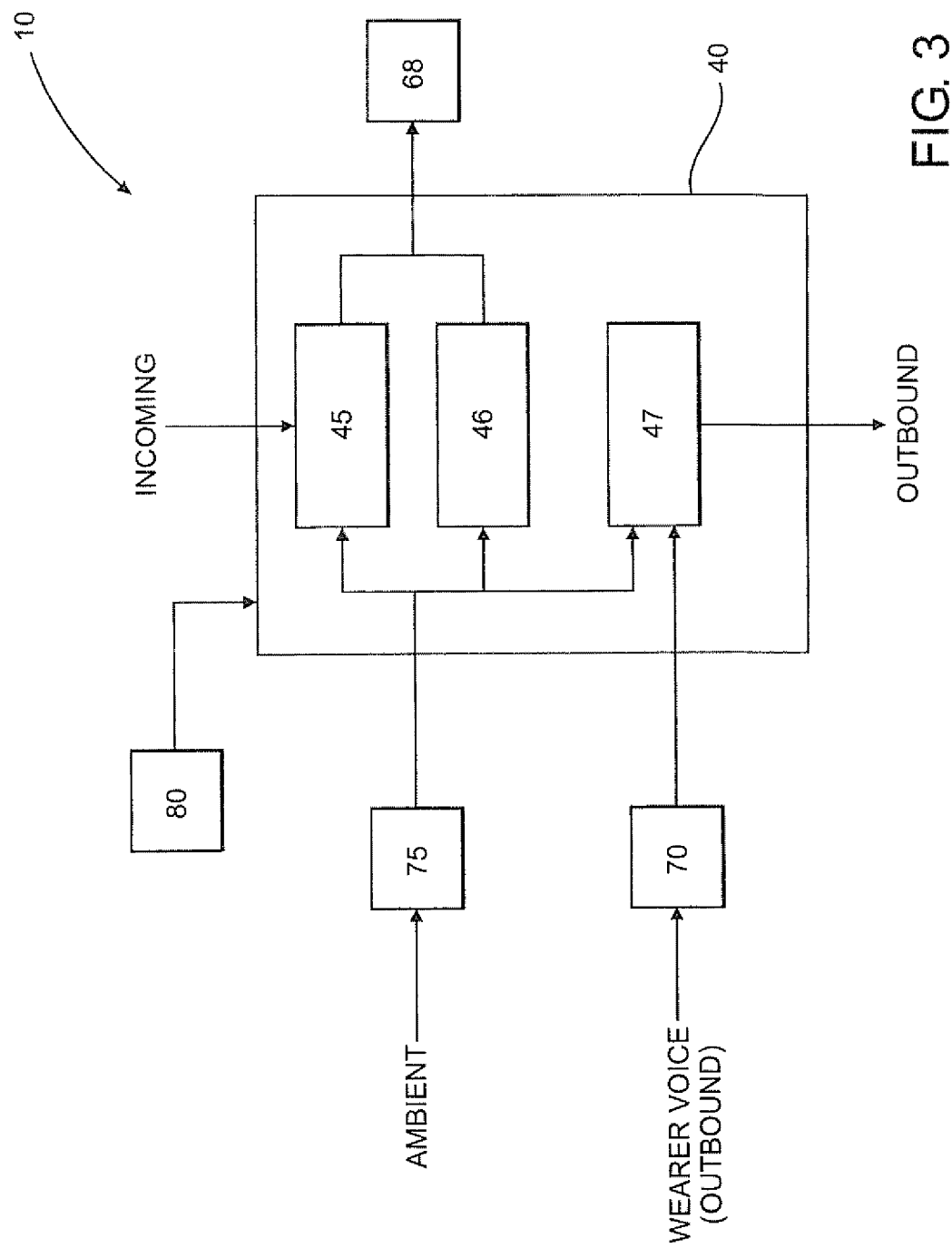
FIG. 3 is a schematic illustration of one embodiment of an audio signal enhancement configuration in accordance with the present invention.

As indicated above, the processor 40 is structured to transmit to another entity the outbound audio signal received from the outbound microphone assembly 70. Moreover, the processor 40 is additionally structured to enhance the outbound audio signal based on the ambient audio signal, and further structured and disposed to transmit the enhanced outbound audio signal to another entity. For example, because the outbound signal can be generated in the same environment as the ambient signal, the outbound audio signal, itself, may comprise some ambient noise in addition to the wearer's voice. As such, in at least one embodiment, the processor 40 is structured to strengthen the outbound audio signal relative to the ambient audio signal. More specifically, and as seen in the embodiment of FIG. 3, the processor 40 includes a signal strengthening circuit 47 structured to reduce an ambient noise component of the outbound audio signal and strengthen the voice component of the outbound audio signal based on the characteristics of the ambient audio signal. In a further embodiment wherein two earpieces 60 are each disposed at a different one of the wearer's ears, the processor 40 can be additionally structured to enhance the outbound audio signal based on the ambient audio signal picked up from each respective side of the wearer.

Referring now to some additional operational capabilities of the communication eyewear assembly 10, in at least one embodiment, the processor 40 is further structured to identify a voice component of the ambient audio signal which has been picked up by the ambient microphone assembly 75 and sent to the processor 40. This can occur, for example, when another person speaks directly to the wearer without using another communication device. For instance, in the embodiment of FIG. 3, the processor 40 includes a voice identification circuit 46 structured to identify a voice component of the ambient audio signal. As such, the processor 40 is further structured to transmit the identified voice component of the ambient signal to at least one earpiece 60 to audibly communicate the voice component of the ambient audio signal to the wearer via the speaker assembly 68. Accordingly, the wearer can listen to the other person's direct verbal communication without having to first remove or otherwise manually adjust the fit of the communication eyewear assembly 10. In a further embodiment, such as in a high noise environment wherein the other person directs their speech toward a specific one of the wearer's earpieces 60, the processor 40 is further structured to transmit the identified voice component to the corresponding earpiece 60.

The processor 40 can also be structured to pause the enhancement of at least one type of audio signal upon identification of the voice component of the ambient audio signal. For example, in one embodiment, the processor 40 is structured to pause the enhancement of the incoming audio signal when the voice component of the ambient audio signal is identified so that the processor 40 can transmit the voice component of the ambient signal to the earpiece 60 instead of transmitting an enhanced incoming audio signal to the earpiece 60.

In a still further embodiment, the processor 40 is structured to resume the enhancement of at least one type of audio signal after the enhancement has been paused. For instance, in one embodiment, the processor 40 is structured to resume the enhancement of the incoming audio signal upon disappearance of the voice component of the ambient audio signal. This can occur, for example, when the other person stops speaking, thus causing the voice component of the ambient audio signal to disappear. In another embodiment, the processor 40 is structured to resume the enhancement of the incoming audio signal after a predetermined period of time. As just one example, the predetermined period of time could comprise about five (5) seconds, although it is within the scope and intent of the present invention that a variety of other suitable periods of time could also be utilized. In yet another embodiment, the processor 40 is structured to resume the enhancement of the incoming audio signal upon receipt of an outbound audio signal, such as that of the wearer's voice. In still another embodiment, the processor 40 is structured to resume the enhancement of the incoming audio signal upon engagement of an audio enhancement switch 80, discussed next.

With reference again to FIG. 1, the communication eyewear assembly 10 further comprises an audio enhancement switch 80. The audio enhancement switch is structured and disposed to permit selective control of at least one type of audio signal enhancement performed by the processor 40. More specifically, the audio enhancement switch 80 is disposed in communication with the processor 40 and structured to pause and/or resume the audio enhancement performed by the processor 40. In one embodiment, the audio enhancement switch 80 can be structured to control the enhancement of the incoming audio signal. In another embodiment, the audio enhancement switch 80 can be structured to control the enhancement of the outbound audio signal.

The audio enhancement switch 80 can be disposed in a variety of suitable locations, such as on the frame assembly 20 or on at least one of the earpieces 60. In the embodiment of FIG. 1, for instance, the audio enhancement switch 80 is disposed on the first leg 23. In addition, the audio enhancement switch 80 depicted in FIG. 1 comprises a touch sensitive configuration such that the audio enhancement switch 80 is engaged and/or disengaged by the wearer's touch. It is, however, within the scope and intent of the present invention that the audio enhancement switch 80 may also utilize other configurations including, but not limited to, toggles, push buttons, rockers, etc.

Figure 5:
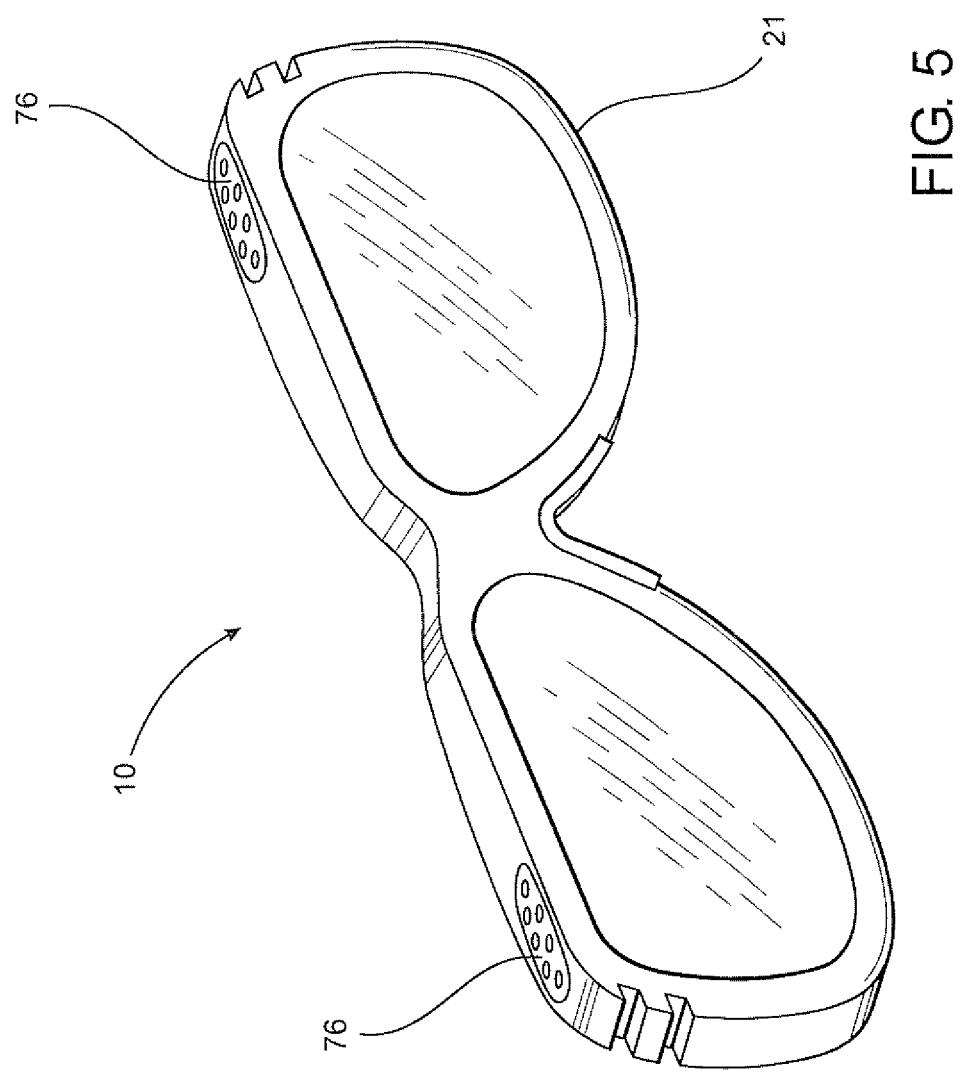
FIG. 5 is a partial perspective view of another embodiment of a communication eyewear assembly in accordance with the present invention.

Turning to FIG. 5, another embodiment of the communication eyewear assembly 10 is depicted wherein the ambient microphone assembly 75 is coupled to the frame assembly 20. Specifically, in the embodiment of FIG. 5, the ambient microphone assembly 75 comprises two frame microphone assemblies 76 each disposed on a different side of the front frame member 21. As with the earpiece microphone assemblies 66, discussed above, the frame microphone assemblies 76 are disposed and structured to pick up an ambient audio signal and transmit the ambient audio signal to the processor 40. Further, in the embodiment of FIG. 5, a distance of several inches, preferably about four to five inches (4"-5"), which separates the frame microphone assemblies 76 from one another provides sufficient separation such that disparate sources of sound can be geometrically differentiated by the processor 40 based on the variations in the audio signals picked up by each individual frame microphone assembly 76. In this embodiment, the frame microphone assemblies 76 are in disposed in wired communication with the processor 40. However, in another embodiment, the frame microphone assemblies 76 can be disposed in wireless communication with the processor 40, such as with the second transceiver 44. It should also be noted that, in other embodiments, the ambient microphone assembly 75 could comprise other numbers of frame microphone assemblies 76, including, for example, just a single frame microphone assembly 76. Moreover, in other embodiments, the frame microphone assemblies 76 can also be disposed at other suitable locations, such as on the legs 23, 24, or elsewhere.

Figure 6:
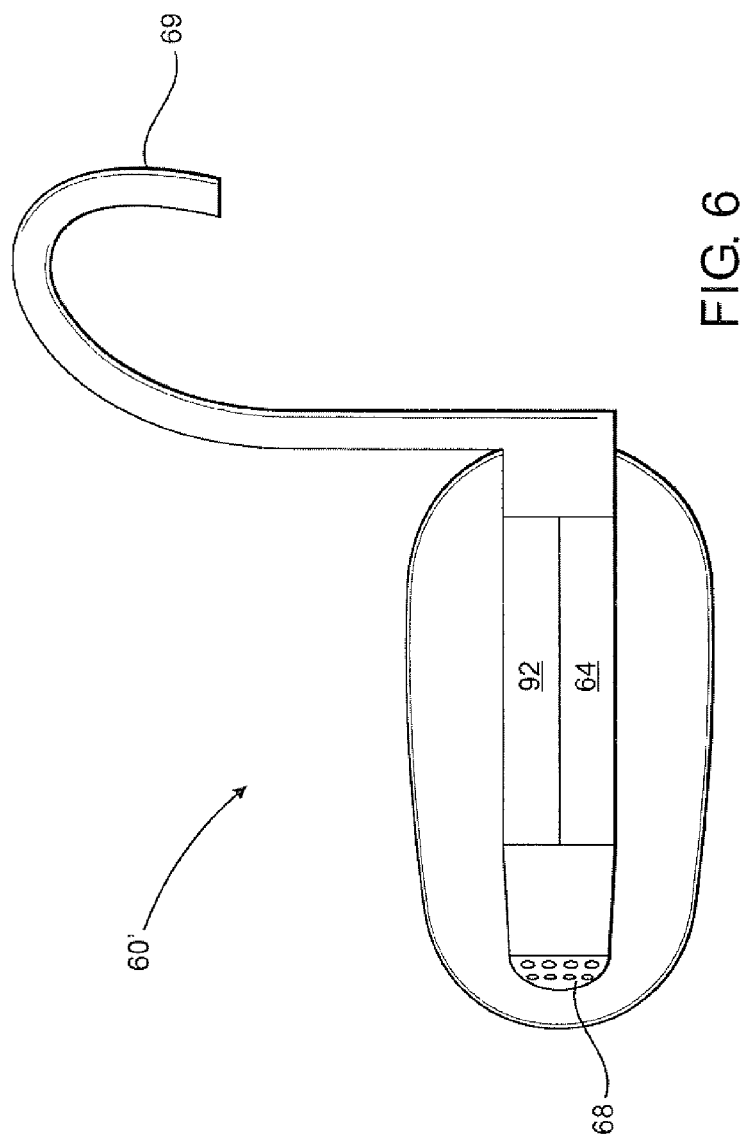
FIG. 6 is a cross section view of another embodiment of an earpiece in accordance with the present invention.

Furthermore, and as shown in FIG. 6, the earpieces 60' utilized with the embodiment of FIG. 5 do not need to include any earpiece microphone assemblies 66, as the frame microphone assemblies 76 are structured to perform substantially the same functions as the earpiece microphone assemblies 66. However, in still other embodiments, the ambient microphone assembly 75 could comprise any combination of frame microphone assemblies 76 and earpiece microphone assemblies 66.

Figure 7:
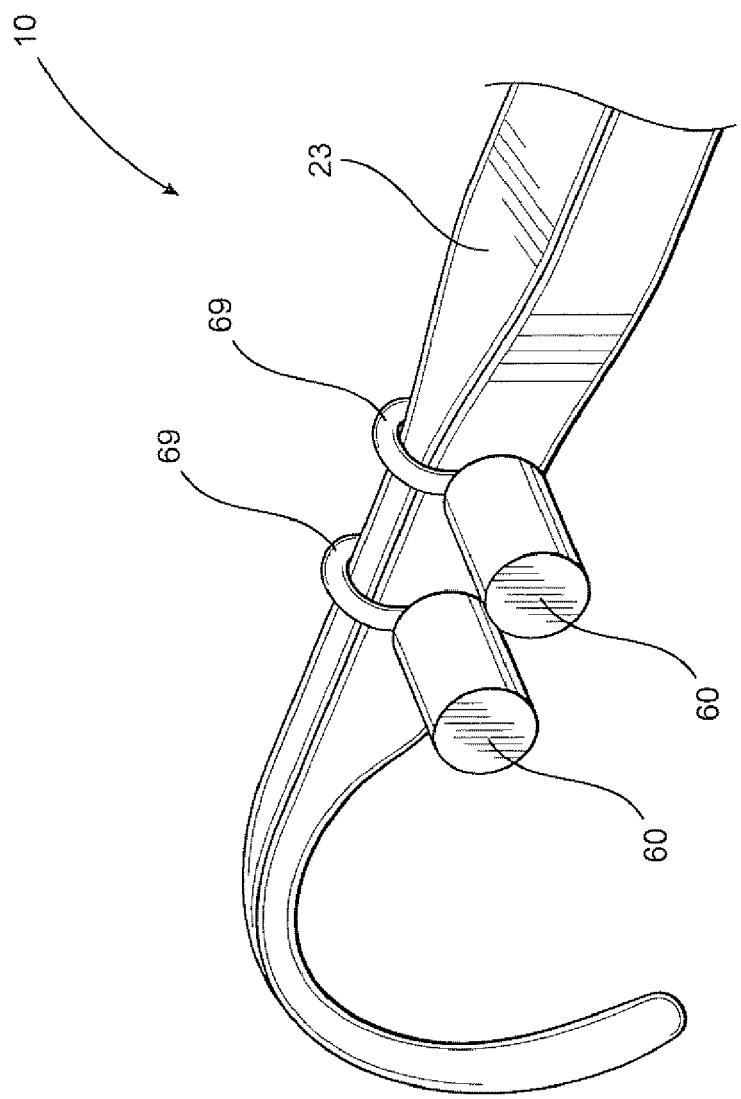
FIG. 7 is a partial perspective view of one embodiment of earpiece clips operatively disposed in accordance with the present invention.
Figure 8:
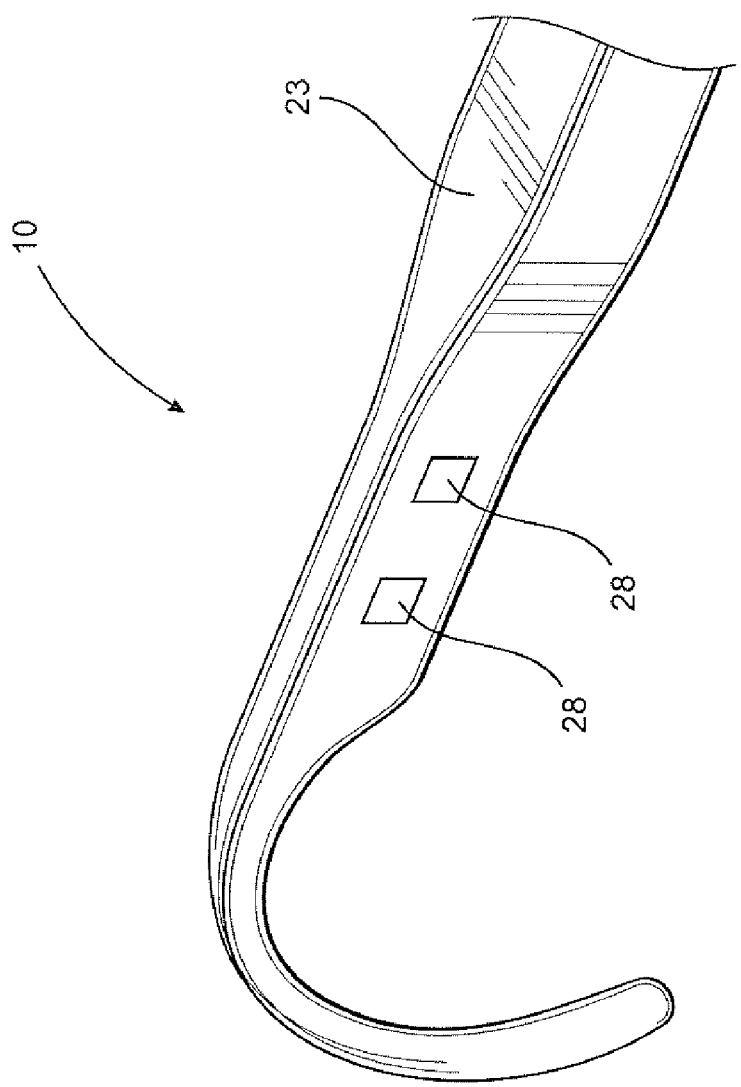
FIG. 8 is a partial perspective view of one embodiment of earpiece charging contacts in accordance with the present invention.

With reference now to FIGS. 4, 6, 7, and 8, in at least one embodiment, the earpieces 60 are further structured to be removably secured to the frame assembly 20 for storage. As seen in FIG. 7, each earpiece 60 comprises a clip 69 structured to removably secure the earpiece 60 to the frame assembly 20 when the earpiece 60 is not in use. In the embodiment of FIG. 7, the two earpieces 60 are removably secured to the first leg 23, each disposed in a stored orientation. It is within the scope and intent of the present invention, however, that the earpieces 60 may also be removably secured to other portions of the frame assembly, including, but not limited to, the second leg 24, the front frame member 21, etc.

In a further embodiment, the earpiece 60 and the frame assembly 20 are cooperatively structured to charge a rechargeable earpiece power supply 92 when the earpiece 60 is disposed in a stored orientation. In at least one such embodiment, one or more charging contacts 28 are disposed on the frame assembly 20 and structured to facilitate the charging of the earpiece power supply 92. For example, in the embodiment depicted in FIG. 8, two charging contacts 28 are disposed on the first leg 23 such that when the earpieces 60 are disposed in the stored orientation of FIG. 7, contact between the charging contacts 28 and the respective earpieces 60 facilitates charging of the respective earpiece power supplies 92. In one such embodiment, the earpiece power supplies 92 are charged by the main power supply 90 of the assembly 10. In another embodiment, the earpiece power supplies 92 can also be charged by an external power source that has been removably coupled to the assembly 10.

Turning now to some additional aspects of the present invention involving visual communication, the assembly 10 further includes a camera assembly 103 disposed and structured to pick up an outbound visual signal, which may comprise image data and/or video data. Referring again to FIG. 1, in one embodiment, the camera assembly 103 comprises a single camera 105 disposed on a central area of the front frame member 21 and facing towards a field of view from the wearer's perspective. It should be noted, however, that it is within the scope and intent of the present invention that a plurality of cameras 105 may be utilized, and further, that one or more cameras 105 may be disposed on a variety of other suitable portions of the assembly 10, including, but not limited to, other positions on the front frame member, on the legs 23, 24, etc. Because the assembly 10 is worn on a wearer's head, the outbound visual signal will typically reflect the view as seen from the wearer's perspective, although other views may also be captured including, but not limited to, views directed behind the wearer. Further, the camera assembly 103 will typically pick up visual signals in the visible spectrum. However, in a further embodiment, the camera assembly 103 can pick up visual signals in other spectra, including, but not limited to, the infrared spectrum.

As with the other aforementioned multimedia components, the camera assembly 103 is further structured to transmit the outbound visual signal to the processor 40. Accordingly, the processor 40 is structured to transmit to another entity the outbound visual signal received from the camera assembly 103.

The processor 40 is also structured to receive an incoming visual signal from a remote location. For instance, the incoming visual signal may comprise image data and/or video data, such as pictures or movies from a remotely stored and transmitted data file. As such, the assembly 10 further comprises a display assembly 22 disposed and structured to display the incoming visual signal received by the processor 40. More specifically, the display assembly 22 includes at least one display unit 26 disposed and structured to display the incoming visual signal to the wearer. For example, with reference to the embodiment of FIG. 1, the display assembly 22 comprises a single display unit 26 which is at least partially disposed on an exterior surface of one of the eye panels 25. The display unit 26 is further structured to project an image of the received incoming visual signal towards the wearer's eye. In another embodiment, the display unit 26 is structured to project an image of the received incoming visual signal onto the eye panel 25 such that the wearer's eye can perceive the displayed visual signal as emanating from the interior and/or exterior surface of the eye panel 25. Although the embodiment of FIG. 1 depicts the display unit 26 positioned on the exterior surface of the eye panel 25, the display unit 26 may alternatively be disposed on the interior surface of the eye panel 25, or within the eye panel 25.

Figure 9:
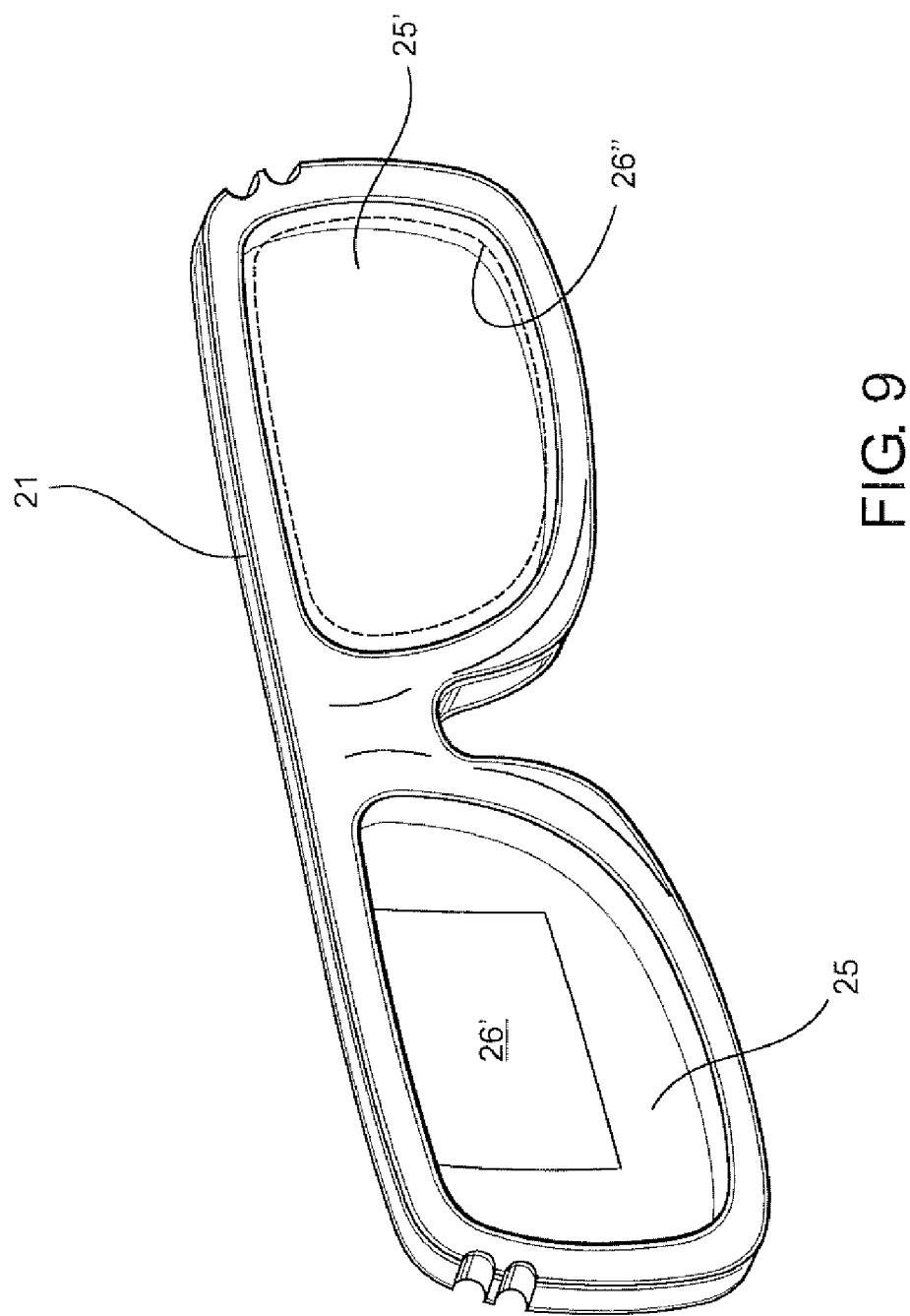
FIG. 9 is a partial perspective view of a communication eyewear assembly having a display assembly which includes two different types of display units.

In a further embodiment, the display assembly 22 includes at least one display unit 26 corresponding to each eye panel 25. For instance, the embodiment of FIG. 9 depicts two other variations of the display unit 26', 26", each coupled to a respective eye panel 25. As depicted, a first display unit 26' is disposed on the interior surface of one eye panel 25, and is further structured to display the incoming visual signal in a partial field of vision defined by the eye panel 25. The second display unit 26" is disposed within the other eye panel 25', and is further structured to display the incoming visual signal in substantially the entire field of vision defined by the eye panel 25'.

With regard to the construction of the display unit 26, the display unit 26 may comprise a variety of suitable materials and structures. For example, the display unit 26 may comprise flat panel display technology, such as, but not limited to, liquid crystal display (LCD) technology, organic light emitting diode (OLED) display technology, etc. Moreover, the display unit 26 can be further structured to at least partially correspond to the contour of the eye panel 25.

The display unit 26 can be additionally structured to maintain a substantially transparent state until receipt of the incoming visual signal from the processor 40, whereupon the display unit 26 will display the visual signal accordingly. In one such embodiment, the display of the incoming visual signal is physically triggered by an electrical input received by the display unit 26 from the processor 40.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A communication eyewear assembly comprising:
   a frame assembly;
   at least one substantially transparent eye panel coupled to said frame assembly;
   said frame assembly structured to be supportably disposed on a wearer so as to maintain said at least one eye panel disposed in a generally shielding position in front of the wearer's eyes;
   a processor coupled to said frame assembly, said processor structured and disposed to receive an incoming audio signal;
   at least one earpiece structured to be disposed in wireless communication with said processor and further structured to be disposed at one of the wearer's ears;
   said at least one earpiece further comprising a rechargeable earpiece power supply structured and disposed to provide power to at least said speaker assembly, and wherein said earpiece and said frame assembly are structured to be clipped to one another to define a stored orientation and are cooperatively structured to charge said rechargeable earpiece power supply when said at least one earpiece is disposed in said stored orientation;
   said processor further structured to transmit said incoming audio signal to said at least one earpiece;
   said at least one earpiece further comprising a speaker assembly structured and disposed to audibly communicate said incoming audio signal to the wearer;
   an outbound microphone assembly disposed and structured to pick up an outbound audio signal from the wearer and transmit said outbound audio signal to said processor;
   said processor further structured and disposed to transmit said outbound signal; and
   an ambient microphone assembly disposed and structured to pick up an ambient audio signal and transmit said ambient audio signal to said processor.

2. An assembly as recited in claim 1 wherein said processor is further structured to enhance said incoming audio signal based on said ambient audio signal.

3. An assembly as recited in claim 2 wherein said processor is structured to adjust a volume level of said incoming audio signal relative to a volume level of said ambient audio signal.

4. An assembly as recited in claim 1 wherein said processor is further structured to enhance said outbound audio signal based on said ambient audio signal.

5. An assembly as recited in claim 4 wherein said processor is structured to strengthen said outbound audio signal relative to said ambient audio signal.

6. An assembly as recited in claim 1 wherein said ambient microphone assembly is coupled to said at least one earpiece.

7. An assembly as recited in claim 1 wherein said ambient microphone assembly is coupled to said frame assembly.

8. An assembly as recited in claim 1 wherein said at least one earpiece is further structured to substantially muffle ambient noise.

9. An assembly as recited in claim 8 wherein at least a portion of said at least one earpiece is structured to be inserted into the wearer's ear so as to substantially muffle ambient noise.

10. An assembly as recited in claim 9 wherein said at least one earpiece comprises a disposable insert structured to substantially muffle ambient noise.

11. An assembly as recited in claim 1 wherein said processor is further structured to identify a voice component of said ambient audio signal.

12. An assembly as recited in claim 11 wherein said processor is further structured to transmit said voice component of said ambient audio signal to said at least one earpiece, and wherein said speaker assembly is structured and disposed to audibly communicate said voice component to the wearer.

13. An assembly as recited in claim 1 further comprising a camera assembly, said camera assembly disposed and structured to pick up an outbound visual signal and transmit said outbound visual signal to said processor, said processor further structured and disposed to transmit said outbound visual signal.

14. An assembly as recited in claim 1 wherein said processor is further structured to receive an incoming visual signal, and wherein said assembly further comprises a display assembly, said display assembly disposed and structured to display said incoming visual signal to the wearer.

15. A communication eyewear assembly comprising:
    a frame assembly;
    at least one substantially transparent eye panel coupled to said frame assembly;
    said frame assembly structured to be supportably disposed on a wearer so as to maintain said at least one eye panel disposed in a generally shielding position in front of the wearer's eyes;
    a processor coupled to said frame assembly, said processor structured and disposed to receive an incoming audio signal;
    at least one earpiece structured to be disposed in wireless communication with said processor and further structured to be disposed at one of the wearer's ears;
    an ambient microphone assembly disposed and structured to pick up an ambient audio signal and transmit said ambient audio signal to said processor;
    said processor further structured to enhance said incoming audio signal based on said ambient audio signal;
    said processor further structured to transmit said enhanced incoming audio signal to said at least one earpiece;
    said at least one earpiece further comprising a speaker assembly structured and disposed to audibly communicate said enhanced incoming audio signal to the wearer, and a clip structured to removably secure said at least one earpiece to said frame assembly in a stored orientation;
    an outbound microphone assembly disposed and structured to pick up an outbound audio signal from the wearer and transmit said outbound audio signal to said processor;
    said processor further structured to enhance said outbound audio signal based on said ambient audio signal; and
    said processor further structured and disposed to transmit said enhanced outbound signal.

16. An assembly as recited in claim 15 wherein said ambient microphone assembly is coupled to said at least one earpiece.

17. An assembly as recited in claim 15 wherein said ambient microphone assembly is coupled to said frame assembly.

18. An assembly as recited in claim 15 wherein said at least one earpiece is further structured to substantially muffle ambient noise.

19. An assembly as recited in claim 18 wherein at least a portion of said at least one earpiece is structured to be inserted into the wearer's ear so as to substantially muffle ambient noise.

20. An assembly as recited in claim 19 wherein said at least one earpiece comprises a disposable insert structured to substantially muffle ambient noise.

21. An assembly as recited in claim 15 wherein said at least one earpiece further comprises a rechargeable earpiece power supply structured and disposed to provide power to at least said speaker assembly, and wherein said earpiece and said frame assembly are cooperatively structured to charge said rechargeable earpiece power supply when said at least one earpiece is disposed in said stored orientation.

22. An assembly as recited in claim 15 further comprising a camera assembly, said camera assembly disposed and structured to pick up an outbound visual signal and transmit said outbound visual signal to said processor, said processor further structured and disposed to transmit said outbound visual signal.

23. An assembly as recited in claim 15 wherein said processor is further structured to receive an incoming visual signal, and wherein said assembly further comprises a display assembly, said display assembly disposed and structured to display said incoming visual signal to the wearer.

24. A communication eyewear assembly comprising:
a frame assembly;
at least one substantially transparent eye panel coupled to said frame assembly;
said frame assembly structured to be supportably disposed on a wearer so as to maintain said at least one eye panel disposed in a generally shielding position in front of the wearer's eyes;
a processor coupled to said frame assembly, said processor structured and disposed to receive an incoming audio signal;
at least one earpiece structured to be disposed in wireless communication with said processor and further structured to be disposed at one of the wearer's ears;
said at least one earpiece further comprising a rechargeable earpiece power supply structured and disposed to provide power to at least said speaker assembly, and wherein said earpiece and said frame assembly are cooperatively structured to charge said rechargeable earpiece power supply when said at least one earpiece is disposed in a stored orientation;
an earpiece microphone assembly disposed and structured to pick up an ambient audio signal and transmit said ambient audio signal to said processor;
said processor is further structured to enhance said incoming audio signal based on said ambient audio signal;
said processor further structured to transmit said enhanced incoming audio signal to said at least one earpiece;
said at least one earpiece further comprising a speaker assembly structured and disposed to audibly communicate said enhanced incoming audio signal to the wearer;
an outbound microphone assembly disposed and structured to pick up an outbound audio signal from the wearer and transmit said outbound audio signal to said processor;
said processor further structured to enhance said outbound audio signal based on said ambient audio signal; and
said processor further structured and disposed to transmit said enhanced outbound audio signal.

25. An assembly as recited in claim 24 comprising a first earpiece structured to be disposed at first one of the wearer's ears and a second earpiece structured to be disposed at second one of the wearer's ears.

26. An assembly as recited in claim 24 wherein said at least one earpiece is further structured to substantially muffle ambient noise.

27. An assembly as recited in claim 26 wherein at least a portion of said at least one earpiece is structured to be inserted into the wearer's ear so as to substantially muffle ambient noise.

28. An assembly as recited in claim 27 wherein said at least one earpiece comprises a disposable insert structured to substantially muffle ambient noise.

29. An assembly as recited in claim 24 further comprising an audio enhancement switch structured and disposed to permit selective control of said enhancement of said incoming audio signal.

30. An assembly as recited in claim 24 further comprising an audio enhancement switch structured and disposed to permit selective control of said enhancement of said outbound audio signal.

31. An assembly as recited in claim 24 further comprising a camera assembly, said camera assembly disposed and structured to pick up an outbound visual signal and transmit said outbound visual signal to said processor, said processor further structured and disposed to transmit said outbound visual signal.

32. An assembly as recited in claim 24 wherein said processor is further structured to receive an incoming visual signal, and wherein said assembly further comprises a display assembly, said display assembly disposed and structured to display said incoming visual signal to the wearer.

* * * * *